Jan. 15, 1929.  1,699,435
C. M. KEARNS
SHOCK ABSORBING DEVICE
Filed April 30, 1927  2 Sheets-Sheet 1
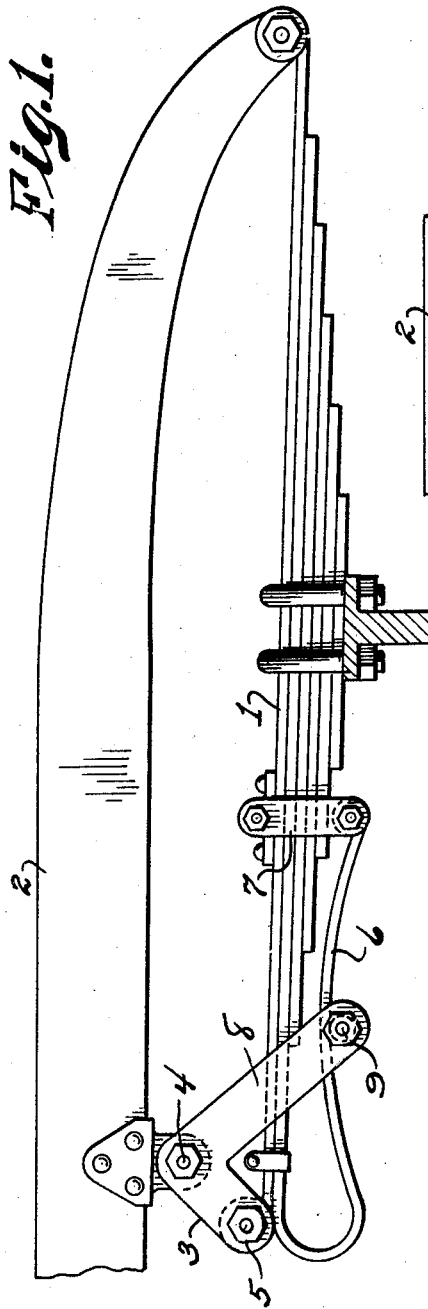
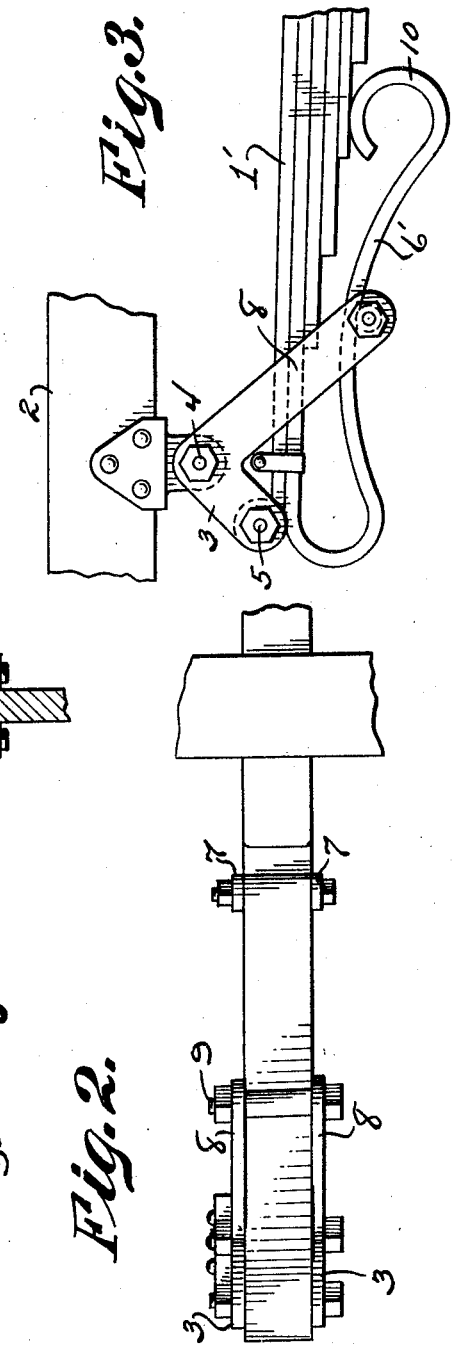
Charles M. Kearns INVENTOR
BY *Victor J. Evans*
ATTORNEY
WITNESS:

Jan. 15, 1929.
C. M. KEARNS
1,699,435
SHOCK ABSORBING DEVICE
Filed April 30, 1927    2 Sheets-Sheet 2
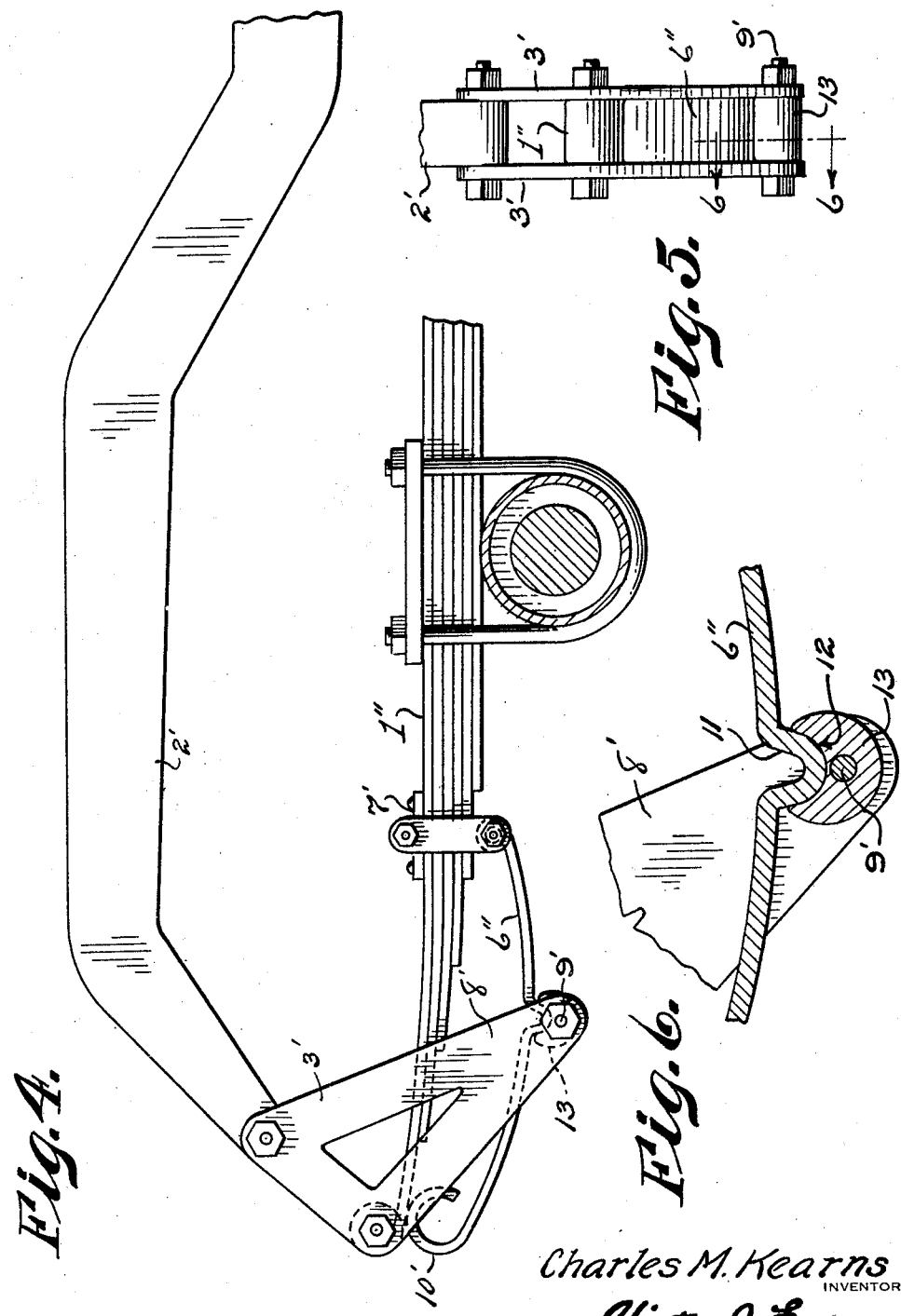

Patented Jan. 15, 1929.

1,699,435

UNITED STATES PATENT OFFICE.

CHARLES M. KEARNS, OF BEAVERTOWN, PENNSYLVANIA.

SHOCK-ABSORBING DEVICE.

Application filed April 30, 1927. Serial No. 187,948.

This invention relates to a shock absorber for the spring of a vehicle, the general object of the invention being to provide means controlled by the movement of the spring for checking the compression movement of the spring under abnormal road conditions but which will not interfere in any way with the movement of the spring under normal road conditions, such means also acting to check all rebound movement below the straight position of the main spring and permitting the main spring to return to straight position from compression position unresisted.

Another object of the invention is to provide a lever forming part of the spring shackle and which is, therefore, moved by the movement imparted to the shackle by the spring with a spring associated with the main spring and engaged by the lever, the lever and its spring being so arranged that the main spring will have free movement under normal road conditions but will be checked as to its compression movement under abnormal road conditions.

A still further object of the invention is to so arrange the parts that the checking effect will gradually come into play on the compression movement of the main spring and the checking action will quickly come into play upon the recoil movement of the main spring below its straight position.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is a side view of the front spring of a vehicle and a part of the frame, showing the invention in use.

Figure 2 is a bottom plan view of Figure 1.

Figure 3 is a fragmentary side view showing a slight modification.

Figure 4 is a side view showing the invention applied to the rear spring of the vehicle.

Figure 5 is an end view of Figure 4.

Figure 6 is a section on line 6—6 of Figure 5.

Referring to Figures 1 and 2 of the drawings, 1 indicates the main spring, 2 a part of one of the side bars of the frame of the vehicle and 3 indicates the shackle which is pivotally connected with the bar 2, as shown at 4, and to the top leaf of the spring, as shown at 5.

In carrying out my invention, I form an extension on the second leaf of the spring and curve said extension under the spring to provide an auxiliary spring 6 which has its free end connected to the main spring by the shackle 7. I also provide an extension on the shackle 3 which forms a lever 8, the two arms of which are connected together by a bolt 9 which extends under the spring 6 approximately at the center of said spring 6. A spacer may be placed on the bolt 9 between the two parts of the lever 8 and the spring 6 engages this spacer.

In the modification shown in Figure 3, the free end of the spring 6, is formed with a loop or scroll 10 which bears against the lower face of one of the leaves of the main spring 1', so that the shackle 7, used for connecting this spring to the main spring, is eliminated.

Figures 4, 5 and 6 show a modified arrangement which may be used for the front or rear spring of the vehicle. As shown in these figures, the shackle 3' is of substantially triangular shape with its comparatively narrow base pivoted to the main spring 1" and to the end of the side bar 2' with its apex carrying the bolt 9' which passes under the auxiliary spring 6". These figures also show the spring 6" as having its inner end connected to the main spring by the shackle 7' and its free outer end bent inwardly against itself to form a loop or scroll 10' which bears against the outer end of the main spring. I also form a U-shaped bend or loop 11 approximately at the center of the spring 6" which rests in a recess 12 formed in a cradle 13 carried by the bolt 9'. This arrangement forms an adjustable bearing point between the lever and the spring, as it adjusts itself to the loop 11 as it is being put in place and then when the bolt is tightened, the cradle will be held in adjusted position.

As will be seen, the triangular shaped shackle member 3' forms a lever 8' for acting against the auxiliary spring, as in the other forms of the invention.

From the foregoing it will be seen that the lever moves with the shackle as the shackle is moved under the compression and recoil movements of the main spring, and as the main spring compresses up to straight position, it will lengthen and cause the lever 8 to move downwardly and as the main spring recoils below straight position, it will shorten and move the lever 8 upwardly. Thus the device is controlled entirely by the main spring.

The parts are so arranged and constructed that the spring 6 will not come into action during the compression movements of the main spring under ordinary road conditions so that the device will not in any way interfere with the usual movements of the main spring, but when said main spring moves in an upward direction to an unusual extent, the auxiliary spring, cooperating with the lever 8, will act to check this unusual movement of the main spring, for as the main spring compresses to an unusual extent, the shackle will cause the lever to move upwardly against the auxiliary spring, thus compressing the same and thereby causing the device to check this compression movement of the main spring, and on the recoil movement below straight position of the main spring, the auxiliary spring is pressed against the lever so that it is compressed thereby in a compounded manner and thus the device will check the recoil movement of the main spring below its straight position.

The shock absorbing effect of the device will gradually come into action on an unusual compression movement of the main spring and the device will permit the main spring to come back to its straight position without interference on the part of the device and the device will quickly come into action on any recoil movement of the spring below the straight position of the main spring.

This device secures the much desired spring control within the spring itself by its peculiar construction and controlling feature. This control can be so constrained as to offer any predetermined degree of resistance, under compression and rebound within certain desirable limits.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. A shock absorbing device for a vehicle spring comprising an auxiliary spring connected with the main spring and means associated with the shackle of the main spring and movable therewith for engaging the auxiliary spring without compressing the same to any appreciable extent under ordinary compression movements of the main spring but acting to compress said auxiliary spring under unusual compression movements of the main spring and more effectively checking said main spring under rebound movements which occur below the straight position of the spring.

2. A shock absorbing device for a vehicle spring comprising an auxiliary spring connected with the main spring and a lever connected with the shackle of the main spring and movable therewith for engaging the auxiliary spring without compressing the same to any appreciable extent under ordinary compression movements of the main spring but acting to compress said auxiliary spring under unusual compression movements of the main spring and more effectively under rebound movements which occur below the straight position of the spring.

3. In combination with a spring, a support and a shackle connecting the spring with the support, an auxiliary spring connected with the main spring and a lever connected with the shackle and engaging the auxiliary spring, said auxiliary spring and lever being so arranged that the auxiliary spring will not be compressed to any appreciable extent under ordinary compression movements of the main spring but said auxiliary spring will be compressed to check the movements of the main spring under unusual compression movements of the main spring and said spring and lever checking all rebound movements which occur below the straight position of the main spring.

4. In combination with a semi-elliptical spring, a vehicle frame disposed thereabove and a shackle connecting one end of the spring to the frame, an auxiliary spring connected with the main spring and arranged under one end thereof and a lever connected with the shackle and having a part passing under the auxiliary spring and acting to compress said auxiliary spring when the main spring rebounds below its straight position and when the main spring is compressed to a certain extent.

5. In combinaiton with a semi-elliptical spring, a vehicle frame disposed thereabove and a shackle connecting one end of the spring to the frame, an auxiliary spring located under one end of the main spring and formed from an extension of one of the leaves of the main spring and a lever connected with the shackle and having a part passing under the auxiliary spring, the spring and lever being so arranged that the spring will not be compressed to any appreciable extent under normal compression movements of the main spring but will be compressed under abnormal compression movements of said main spring, said auxiliary spring being compressed by all rebound movements below straight position of the main spring.

6. In combination with a semi-elliptical spring, a vehicle frame disposed thereabove and a shackle connecting one end of the spring to the frame, an auxiliary spring located under one end of the main spring and formed from an extension of one of the leaves of the main spring, a lever connected with the shackle and having a part passing under the auxiliary spring, the spring and lever being so arranged that the spring will not be compressed to any appreciable extent under normal compression movements of the main spring but will be compressed under abnormal compression movements of said main spring, said auxiliary spring being compressed by all rebound movements below the straight position of the main spring and a seat forming part on that part of the lever which passes under the auxiliary spring.

In testimony whereof I affix my signature.

CHARLES M. KEARNS.